C. A. HIRTH.
COLD SAWING MACHINE.
APPLICATION FILED MAR. 19, 1912.
1,047,522.
Patented Dec. 17, 1912.
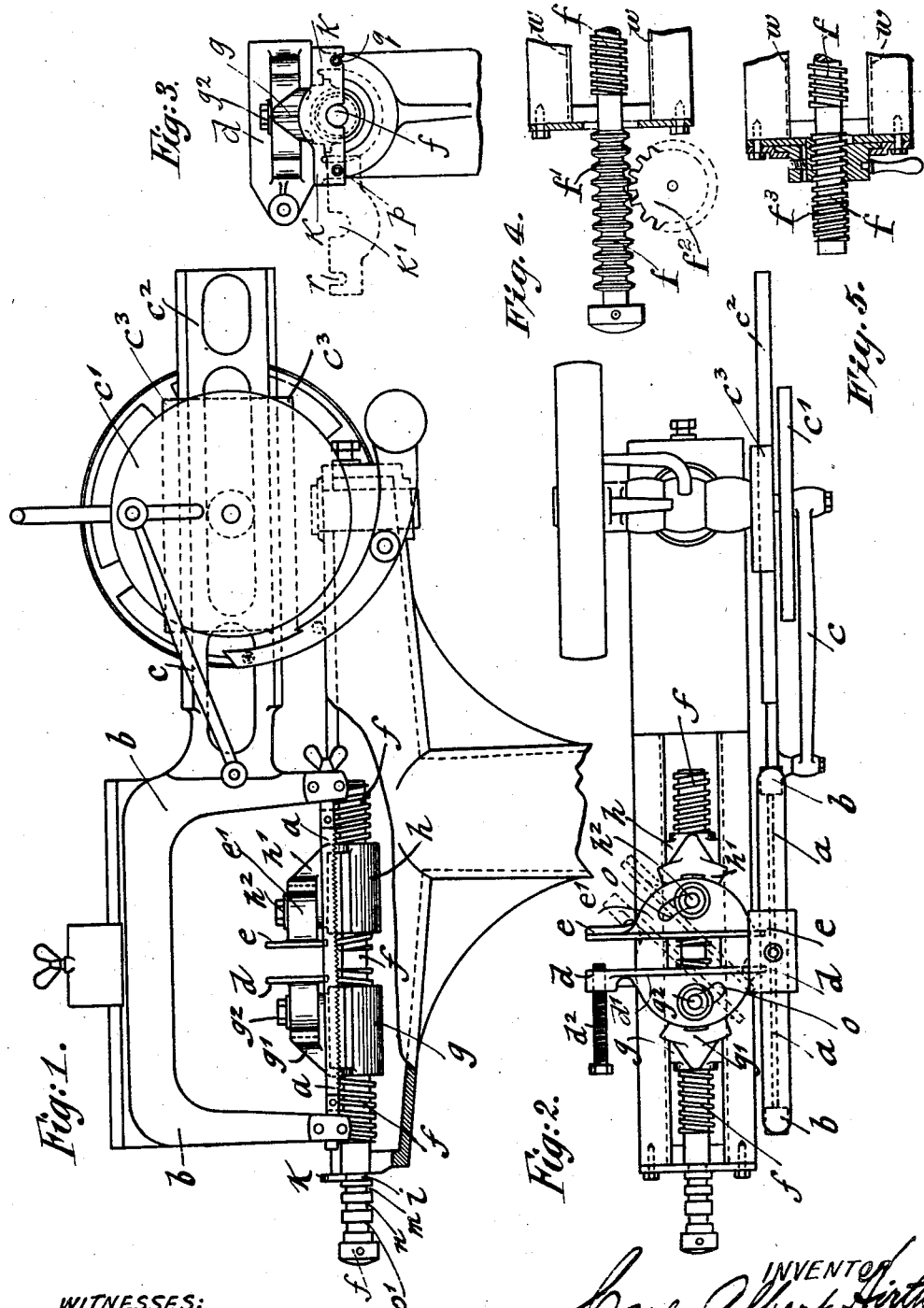
WITNESSES:
John Murtagh
L. M. Dorman
INVENTOR
Carl Albert Hirth,
BY Loepe & Loepe
ATTORNEYS.

UNITED STATES PATENT OFFICE.

CARL ALBERT HIRTH, OF CANNSTATT-STUTTGART, GERMANY, ASSIGNOR TO FORTUNA-WERKE ALBERT HIRTH, OF CANNSTATT-STUTTGART, GERMANY, A CORPORATION OF GERMANY.

COLD-SAWING MACHINE.

1,047,522.      Specification of Letters Patent.      Patented Dec. 17, 1912.

Application filed March 19, 1912. Serial No. 684,829.

*To all whom it may concern:*

Be it known that I, CARL ALBERT HIRTH, a citizen of the German Empire, residing in Cannstatt-Stuttgart, in the Kingdom of Wurttemberg, in said Empire, have invented certain new and useful Improvements in Cold-Sawing Machines, of which the following is a specification.

This invention relates to certain improvements in cold sawing machines by which rectangular and oblique cuts can be accurately made through the work-piece as the same is held in one position or the other by the jaws of the vise closely and reliably to the blade of the cutting saw.

Heretofore the jaws of the vise between which the work-piece was clamped were provided with cheeks which were centrally pivoted to the upper portions of sleeve-shaped nuts that were moved toward or away from each other by a screw-spindle having a right and left-hand screw-thread. When the jaws were turned from their position at right angles to the saw-blade into an oblique position thereto, the front-end of one jaw was moved away from the saw-blade while the front-end of the other jaw was moved closer toward the blade, and with a still greater angle of obliquity, even projecting into the path of the blade. When for instance the jaws are to be set at an oblique angle of inclination toward the right, the right-hand jaw is moved away from the blade and the left-hand jaw toward and close to the blade which has the objection that the blade was liable to injury by contact with the end of one of the front-jaws. For preventing injury to the saw-blade or the jaws, it would be necessary to shorten the jaws, which however would bring the ends of the jaws, when in their rectangular position to the blade, too far away from the same so that when they are turned on their pivots into an oblique position the front-ends of the jaws would be moved too far away from the blade so that the work-piece could not be held with the desired degree of certainty close to the plane of cut and that furthermore by the oblique clamping of the work-piece a turning momentum was exerted on the same by which a tendency was imparted to the jaws to return into their normal position at right angles to the blade.

The object of this invention is to obviate the objections referred to and the invention consists in so arranging the jaws of the vise that the fastening bolts are not used as turning on pivot-bolts, but are located in arc-shaped slots of their cheeks so that the turning axes of both jaws are close to the faces of the jaws whereby the front-ends of the jaws when placed in an oblique position to the blade are both brought close to the vertical plane of the blade.

The invention consists further of providing means for shifting the supporting screw-spindle of the vise in a longitudinal direction and then locking it in the proper position according to the angle of obliquity to which the jaws have to be set toward the blade.

In the accompanying drawings, Figure 1 represents a side-elevation of my improved cold-sawing machine, Fig. 2 a plan-view of Fig. 1, Fig. 3 an end-view of the same, and Figs. 4 and 5 show detail sectional elevations of different means for providing for the longitudinal shifting of the screw-spindle.

Similar letters of reference indicate corresponding parts throughout the several figures of the drawings.

Referring to the drawings, $a$ represents the saw-blade, and $b$ the bow for the same. The bow $b$ is reciprocated in the usual well known manner by means of a connecting-rod $c$ from a crank-disk $c'$ to which motion is imparted by a suitable power-transmission. The bow is provided with a longitudinal guide-piece $c^2$ which is guided in stationary ways $c^3$ of the supporting-frame of the machine, as shown in Figs. 1 and 2. Figs. 1 and 2 show the position of the bow in its median position.

$d$ and $e$ represent the jaws of the vise between which the work-piece is held for the action of the saw-blade $a$. The jaws $d$ and $e$ are so arranged that when they are adjusted at right angles to the path of the blade, the point where the cut is to be made on the work-piece is located midway of the stroke of the blade. The jaws of the vise are supported by means of sleeve-shaped nuts $g$ and $h$ on the spindle $f$ which is provided with right and left-hand screw-threads by which the jaws are moved simultaneously toward or away from each other according to the direction of the turning motion of the screw-spindle.

The cheeks $d'$ and $e'$ of the jaws $d$ and $e$ are made with cylindrical rear-faces $d'$, $e'$ by which they can be adjusted on the correspondingly-shaped abutments $g'$, $h'$ of the nuts $g$ and $h$, the axes of the cylindrical cheeks being located in or as close as possible to the faces of the jaws. In the cheeks of the jaws $d$ and $e$ are arranged arc-shaped slots $o$ in which the supporting-bolts $g^2$ and $h^2$ of the jaws are located. This arrangement permits that the front-ends of the jaws when in their middle position at right angles to the blade, are located closely to the blade, while neither one of the jaws on turning the same into an oblique position to the blade, is placed within the path of the same, whereby the tendency of the jaws to move into a position at right angles to the saw, is neutralized, and the distance of the jaws from the saw rendered as small as possible, the change of position producing in both jaws nearly the same distance from the saw-blade, as indicated by the dotted lines in Fig. 2.

The sleeve-shaped nuts $g$ and $h$ are guided in ways $w$ of the frame of the machine and the spindle supported by the nuts. This arrangement prevents any bending of the spindle in upward direction by a too forceful clamping of the work-piece between the jaws.

The jaw $d$ is provided at its rear-end with an interiorly-threaded eye for receiving a screw-bolt $d^2$ which serves as a stay for the jaws when very short pieces have to be clamped between the same so as to prevent the converging of the rear-ends of the jaws.

When the jaws are adjusted into an oblique position, as indicated in dotted lines in Fig. 2, the point of cutting of the blade would be considerably to one side of the middle of the stroke of the saw, which is open to the objection that the blade will only cut during a part of its entire length and that its stroke would not be fully utilized. The diminution of the useful length of the saw-stroke is equal to double of the shifting distance of the cut, so that thereby the effectiveness of the saw-blade would be considerably diminished. As the stroke of the saw cannot be changed except by changing the entire construction of the machine, it is therefore necessary to bring the obliquely-adjusted work-piece to the middle of the saw-stroke for producing the effective action of the machine. For this purpose the entire machine would have to be taken apart and the jaws of the vise be adjusted one on the right-hand and the other on the left-hand thread of the screw-spindle. This would be, however, very tedious and tiresome, and besides inaccurate, inasmuch as the size of the adjustment cannot be estimated beforehand with absolute certainty. The same inaccuracy would occur when the jaws would be adjusted by means of any other device on the screw-spindle, such as, for instance by means of a split-nut or any other adjusting device between jaws and nuts. This would add another objection, namely, that these adjustable fastening devices have to receive the entire pressure of the device. The present invention obviates these objections by leaving the jaws of the device on the screw-spindle and adjusting the parts in their entirety. This has the advantage that the adjustment can be accomplished in a quick and simple manner, that the pressure of the device is not required to be taken up by the adjusting-means, and especially that the work-piece can be clamped and finally adjusted to the required oblique position after it has been ascertained to what degree the adjustment would be necessary. The arrangement for accomplishing this purpose provides that the screw-spindle has at its outer end which projects beyond the supporting-frame, an annular groove $i$ that is engaged by an end-plate $k$ provided with a recess $k'$ that enters into the groove $i$. As the device has to be set to a number of different oblique angles which correspond to 15°, 30°, 45°, etc., a plurality of additional annular grooves $m$, $n$, $o'$ are arranged in addition to the annular groove $i$, so as to permit thereby the different oblique positions of the vise according to the angles referred to. The plate $k$ is pivoted to one of its fastening-screws $p$ and provided with a recess $r$ which fits over the other fastening-screw $q$, as shown in Fig. 3. This same idea can be carried out in different ways. The screw-spindle $f$ could for instance, instead of being provided with several annular grooves at different distances from each other, be provided with regular ring-shaped teeth $f'$ which are engaged by a correspondingly-shaped gear-wheel $f^2$ located at right angles thereto for adjusting the spindle as shown in Fig. 4. Furthermore, the adjustment could be made by a screw-thread $f^3$ on the spindle as shown in Fig. 5, but in this case it would be necessary to make the nut required for this thread stationary during the adjustment of the jaws of the vise toward or away from each other, that thereby a longitudinal shifting of the screw-spindle itself should not take place.

I claim:

1. A cold-sawing machine, comprising means for reciprocating a saw-blade, a screw-spindle having a right and left hand screw-thread, a vise formed of two jaws having straight parallel faces and cheeks with curved rear-faces, sleeve-shaped nuts on the screw-spindle having abutments with curved faces engaging and corresponding in curvature to the rear-faces of the cheeks, and means for adjusting the jaws into an oblique position relatively to the saw-blade, the axes of the curved engaging faces of the cheeks and abutments being located in the faces of the jaws.

2. A cold-sawing machine, comprising means for reciprocating a saw-blade, a screw-spindle having a right and left hand thread, a vise formed of two jaws having cheeks with curved rear-faces and arc-shaped slots, sleeve-shaped nuts having abutments with curved faces engaging and corresponding in curvature to the rear-faces of the cheeks, and pivot-bolts passing through the arc-shaped slots of the cheeks, the axes of the curved engaging faces of the cheeks and abutments being located in the faces of the jaws.

3. A cold-sawing machine, which comprises a reciprocating saw-blade, a vise having jaws obliquely adjustable with respect to the saw-blade, a screw-spindle supporting the jaws of the vise and provided with ring-shaped grooves at the outer end, and means for supporting one of the grooves of the spindle and locking the spindle after longitudinal displacement of the same.

4. A cold-sawing machine, comprising a reciprocating saw-blade, a vise formed of two jaws, a screw-spindle having right and left hand screw-threads for adjusting said jaws and ring-shaped grooves at the outer end of said spindle, means whereby the jaws may be adjusted at an oblique angle to the saw-blade, a locking plate provided with a recess for engaging one of said grooves, and means for securing said plate in engagement with the groove.

In testimony, that I claim the foregoing as my invention, I have signed my name in presence of two subscribing witnesses.

CARL ALBERT HIRTH.

Witnesses:
ERNEST ENTENMANN,
FRIDA KLAIBER.